April 19, 1949.  W. W. COOK  2,467,611
MEAT CARVING RACK
Filed Nov. 18, 1946

INVENTOR.
W.W. Cook

BY Lancaster, Allwine Rommel
ATTORNEYS.

UNITED STATES PATENT OFFICE 2,467,611

MEAT CARVING RACK

William Woodward Cook, Washington, D. C.

Application November 18, 1946, Serial No. 710,552

2 Claims. (Cl. 65—65)

This present invention relates to a rack or support for holding steaks, roasts and other meat dishes on a platter for facilitating the operation of carving.

The principal object of the invention is to provide in a manner as hereinafter set forth, a device which is adapted to be expeditiously mounted on the depressed portions of a reasonably wide range of platters of different sizes and to be held thereon against sliding. The device is further adapted to firmly engage and support pieces of meat of various sizes to be carved so that the piece will not slide off the device and platter.

Another object of the invention is to provide a device of the character described that is strong and durable of pleasing appearance, simple construction and of low manufacturing cost.

Other objects will become apparent as the invention is fully understood which resides in the novelty of construction, combination and arrangement of parts specifically hereinafter described and claimed in the subjoined claims. Reference is made to the accompanying drawing forming part of the application and wherein:

Figure 1:
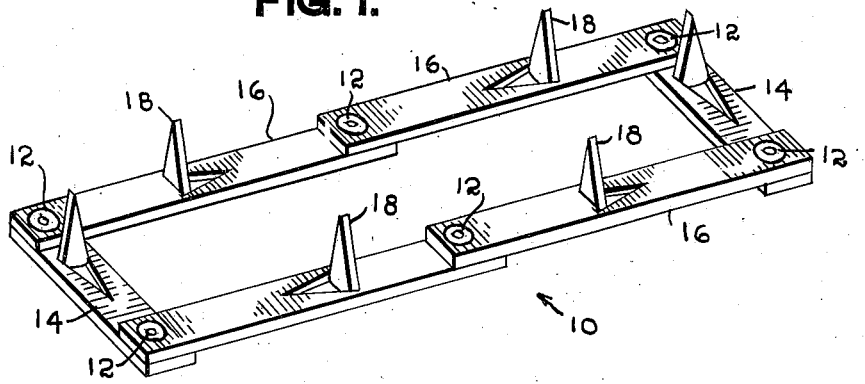
Fig. 1 is a perspective view of the support forming the preferred embodiment of my invention.
Figure 2:
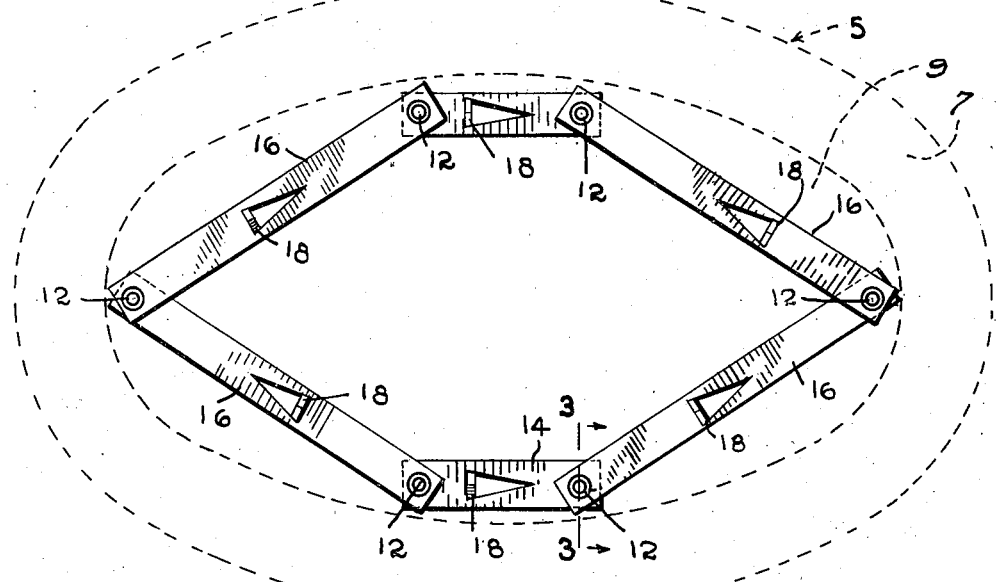
Fig. 2 is a plan view of the support mounted in the depressed central portion of a conventional platter.
Figure 3:
Fig. 3 is an enlarged detail section of one of the pivot joints, taken on line 3—3 of Fig. 2.

In the drawing in which like or similar parts are designated by like characters of reference, Fig. 2 shows in dotted lines a platter generally denoted by 5 and including an outer portion 7 and an inner depressed portion 9.

The support 10 constituting the preferred embodiment of my invention, generally forms an endless ring comprising link sections. Each section is pivoted at either end to an adjoining section by an eyelet 12. While I do not wish to limit myself to a fixed number of link sections, the preferred embodiment of my invention provides a pair of oppositely disposed sections 14 of relatively short lengths. Upon either end of a section 14 rests the nearest end of a longer section 16 for pivotal connection by an eyelet to one of the ends of a short section 14.

The longer sections 16 are preferably of equal length and one of a pair of such sections underlies with its other end a similar section and is pivoted thereto by an eyelet.

In order to facilitate a firm engagement between the meat and the support described and illustrated, each section is provided with an upwardly extending meat-penetrating prong 18 which in the preferred form takes the form of a triangular tongue struck out from the material from which the said sections are constructed.

While no restriction to a single material for the support is intended, the same is preferably made of non-corrosive metal so as to facilitate the formation of the prongs by providing tongues struck out from the intermediate part of a link section. The support may also be made from plastic and the prongs be cast with the rest of the section.

The construction of my support permits the same to be adjusted to anyone of many different configurations. The corners of the links bear against the junction between the inner depressed portion of the platter and the outer part and therefore substantially prevent the slipping of the support relative to the platter.

While I have shown and described a single prong for each link section, a plurality of prongs may be provided if necessary.

The foregoing description and drawing disclose the specific details of the preferred embodiment of my invention as a mere example, not as a limitation. Changes or modifications of those details may therefore be resorted to without departing from the spirit or scope of the invention as long as such changes or modifications fall within the scope of the appended claims.

I claim:

1. In a holder for retaining an article of food upon a support having an inner depressed, upwardly opening portion with a bottom wall and oval border wall extending upwardly therefrom defining said depressed portion, said holder including a plurality of link sections comprising two oppositely-disposed short link sections and a plurality of oppositely-disposed longer link sections, each having a border wall-facing side edge, end edges substantially normal to said side edge, whereby the juncture of said end edges with said side edge form corners, and end portions with the end portions of each link section being in face-to-face contact with the end portions of adjacent link sections, means pivotally connecting each associated face-to-face contacting portion, whereby, when said holder is extended with each short link section forming, with two adjacent longer link sections, a pair of obtuse angles, said corners will abut the oval border wall of said support, and means carried by at least some of said link sections to releasably hold an article of food disposed upon said link sections.

2. In a holder for retaining an article of food upon a support having an inner depressed, upwardly-opening portion with a bottom wall and oval border wall extending upwardly therefrom defining said depressed portion, said holder including a plurality of link sections, each having a border wall-facing side edge, end edges substantially normal to said side edge, whereby the juncture of said end edges with said side edge forms corners, and end portions with the end portions of each link section being in face-to-face contact with the end portions of adjacent link sections, means pivotally connecting each associated face-to-face contacting portion, there being two opposite short link sections and a plurality of longer link sections with one end portion of each longer link section in face-to-face contact with one end portion of an adjacent short link section and the other end portion of each longer link section overlapping the adjacent end portion of an adjacent longer link section whereby, when said holder is extended with each short link section forming with two adjacent longer link sections, a pair of obtuse angles, said corners will abut the oval border wall of said support, and means carried by at least some of said link sections to releasably hold an article of food disposed upon said link sections.

WILLIAM WOODWARD COOK.

REFERENCES CITED

The following references are of record in the file of this patent:

UNITED STATES PATENTS

| Number | Name | Date |
|---|---|---|
| 152,331 | Cass | June 23, 1874 |
| 361,742 | Bennett | Apr. 26, 1887 |
| 436,654 | Frederick | Sept. 16, 1890 |
| 566,479 | Sellman | Aug. 25, 1896 |
| 837,388 | Curial | Dec. 4, 1906 |
| 931,587 | Fairbanks | Aug. 17, 1909 |
| 991,098 | Singer | May 2, 1911 |
| 1,201,061 | Lang | Oct. 10, 1916 |
| 2,322,519 | Ingebrigtsen | June 22, 1943 |

FOREIGN PATENTS

| Number | Country | Date |
|---|---|---|
| 165,617 | Great Britain | July 7, 1921 |